US012591482B2

(12) United States Patent
Li et al.

(10) Patent No.: US 12,591,482 B2
(45) Date of Patent: Mar. 31, 2026

(54) SECURITY CONTROL METHOD AND APPARATUS FOR INTEGRATED CIRCUIT, STORAGE MEDIUM, AND ELECTRONIC DEVICE

(71) Applicant: HORIZON (SHANGHAI) ARTIFICIAL INTELLIGENCE TECHNOLOGY CO., LTD., Shanghai (CN)

(72) Inventors: Wenxing Li, Shanghai (CN); Jing Li, Shanghai (CN); Qingyu Liu, Shanghai (CN); Shunli Cheng, Shanghai (CN); Jianjun Li, Shanghai (CN); Bin Zhu, Shanghai (CN); Junyu Tu, Shanghai (CN); Bo Deng, Shanghai (CN)

(73) Assignee: HORIZON (SHANGHAI) ARTIFICIAL INTELLIGENCE TECHNOLOGY CO., LTD., Shanghai (CN)

( * ) Notice: Subject to any disclaimer, the term of this patent is extended or adjusted under 35 U.S.C. 154(b) by 157 days.

(21) Appl. No.: 18/495,972

(22) Filed: Oct. 27, 2023

(65) Prior Publication Data

US 2024/0176693 A1 May 30, 2024

(30) Foreign Application Priority Data

Nov. 28, 2022 (CN) .......................... 202211499525.5

(51) Int. Cl.
*G06F 11/08* (2006.01)
(52) U.S. Cl.
CPC .................................. *G06F 11/085* (2013.01)
(58) Field of Classification Search
CPC ... G06F 11/085; G06F 21/71; G05B 19/0428; G05B 2219/24024

(Continued)

(56) References Cited

U.S. PATENT DOCUMENTS 11,748,188 B2      9/2023  Chen et al.
2018/0137311 A1*   5/2018  Liu ...................... G06F 21/606
                          (Continued)

FOREIGN PATENT DOCUMENTS

CN      112463785 A      3/2021
CN      112486820 A      3/2021
                    (Continued)

OTHER PUBLICATIONS

First Japanese Office action from corresponding Japanese Patent Application No. 2023-183749, mailed Dec. 3, 2024.

(Continued)

*Primary Examiner* — Albert Decady
*Assistant Examiner* — Osman M Alshack
(74) *Attorney, Agent, or Firm* — K&L Gates LLP

(57) ABSTRACT

The present invention provides a security control method and apparatus for an integrated circuit, a storage medium, and an electronic device. The method includes: determining first error data of a first target control module in a group data collection module, wherein the group data collection module includes at least one first target control module; determining a first check code corresponding to the first error data based on a first collection module in the group data collection module; and controlling, based on the first check code and the first error data, a security control module to perform a preset processing operation corresponding to the first error data. The present disclosure can support collection and processing of a huge number of error data for the integrated circuit.

18 Claims, 9 Drawing Sheets

Determine first error data of a first target control module in a group data collection module, where the group data collection module includes at least one first target control module ⸺510

Determine a first check code corresponding to the first error data based on a first collection module in the group data collection module ⸺520

Control, based on the first check code and the first error data, a security control module to perform a preset processing operation corresponding to the first error data ⸺530

(58) Field of Classification Search
USPC ................................................ 714/752, 758
See application file for complete search history.

(56)                     References Cited

U.S. PATENT DOCUMENTS

| 2018/0188713 | A1 |  | 7/2018 | Hu et al. |
| 2018/0330123 | A1 | * | 11/2018 | Colombo .............. G06F 9/3804 |
| 2019/0156018 | A1 | * | 5/2019 | Tanimoto ............. G06F 21/445 |
| 2020/0192798 | A1 | * | 6/2020 | Natu ................... G06F 11/1004 |
| 2021/0012851 | A1 |  | 1/2021 | Huang et al. |
| 2021/0149765 | A1 | * | 5/2021 | Lee ..................... G06F 11/1048 |
| 2021/0173738 | A1 | * | 6/2021 | Vijayaraghavan ........................... G06F 12/1027 |
| 2021/0326248 | A1 |  | 10/2021 | Zhang et al. |
| 2022/0093470 | A1 | * | 3/2022 | Lee ................... H01L 21/28185 |
| 2023/0147227 | A1 | * | 5/2023 | Lim ........................ G06F 17/16 |
| 2024/0176693 | A1 | * | 5/2024 | Li ........................... G06F 21/71 |

FOREIGN PATENT DOCUMENTS

| CN | 114090316 | A | 2/2022 |
| CN | 114115795 | A | 3/2022 |
| CN | 114138544 | A | 3/2022 |
| JP | S62171045 | A | 7/1987 |
| JP | 2012020487 | A | 2/2012 |
| WO | 2020199377 | A1 | 10/2020 |

OTHER PUBLICATIONS

First Chinese Office action from corresponding Chinese Patent Application No. 2022114995255, mailed Jan. 18, 2025.
Extended European Search Report from corresponding European Patent Application No. 23207518.4, mailed Mar. 21, 2024.

* cited by examiner

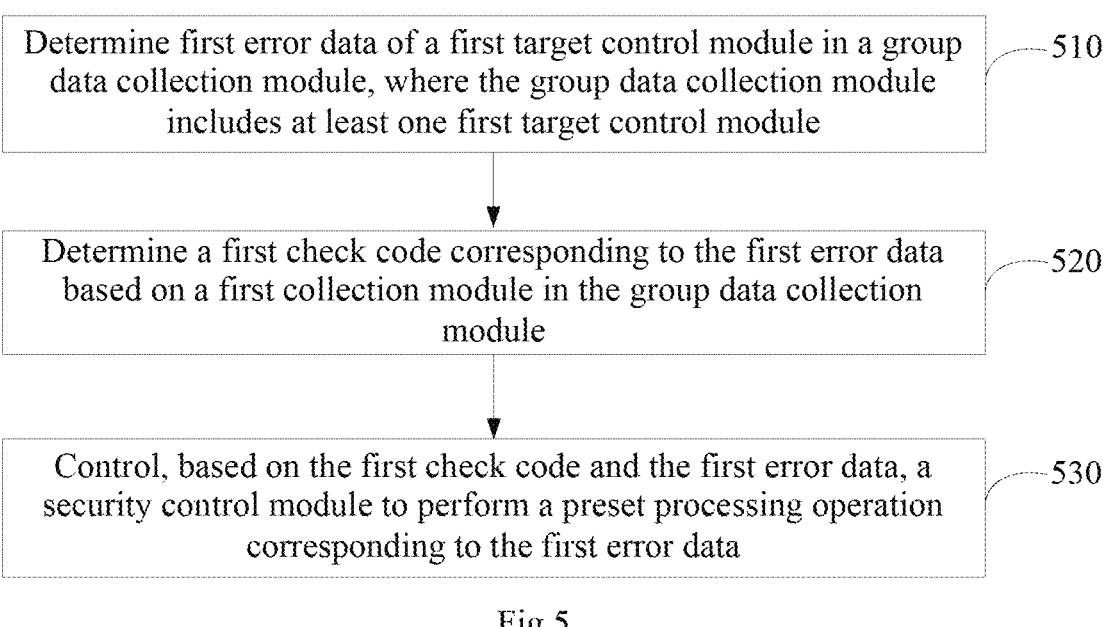

Determine first error data of a first target control module in a group data collection module, where the group data collection module includes at least one first target control module ⟋—510

Determine a first check code corresponding to the first error data based on a first collection module in the group data collection module ⟋—520

Control, based on the first check code and the first error data, a security control module to perform a preset processing operation corresponding to the first error data ⟋—530

Fig.5

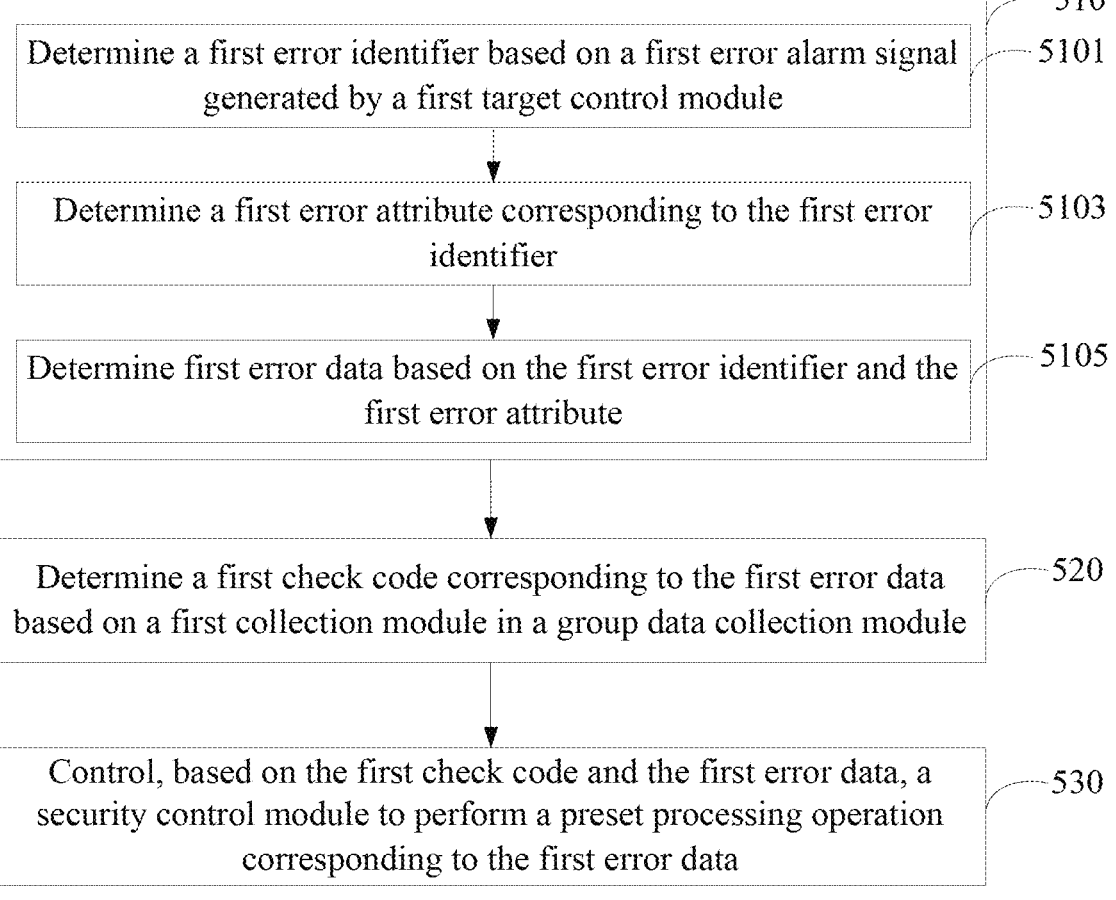

⟋—510

Determine a first error identifier based on a first error alarm signal generated by a first target control module ⟋—5101

Determine a first error attribute corresponding to the first error identifier ⟋—5103

Determine first error data based on the first error identifier and the first error attribute ⟋—5105

Determine a first check code corresponding to the first error data based on a first collection module in a group data collection module ⟋—520

Control, based on the first check code and the first error data, a security control module to perform a preset processing operation corresponding to the first error data ⟋—530

Fig.6

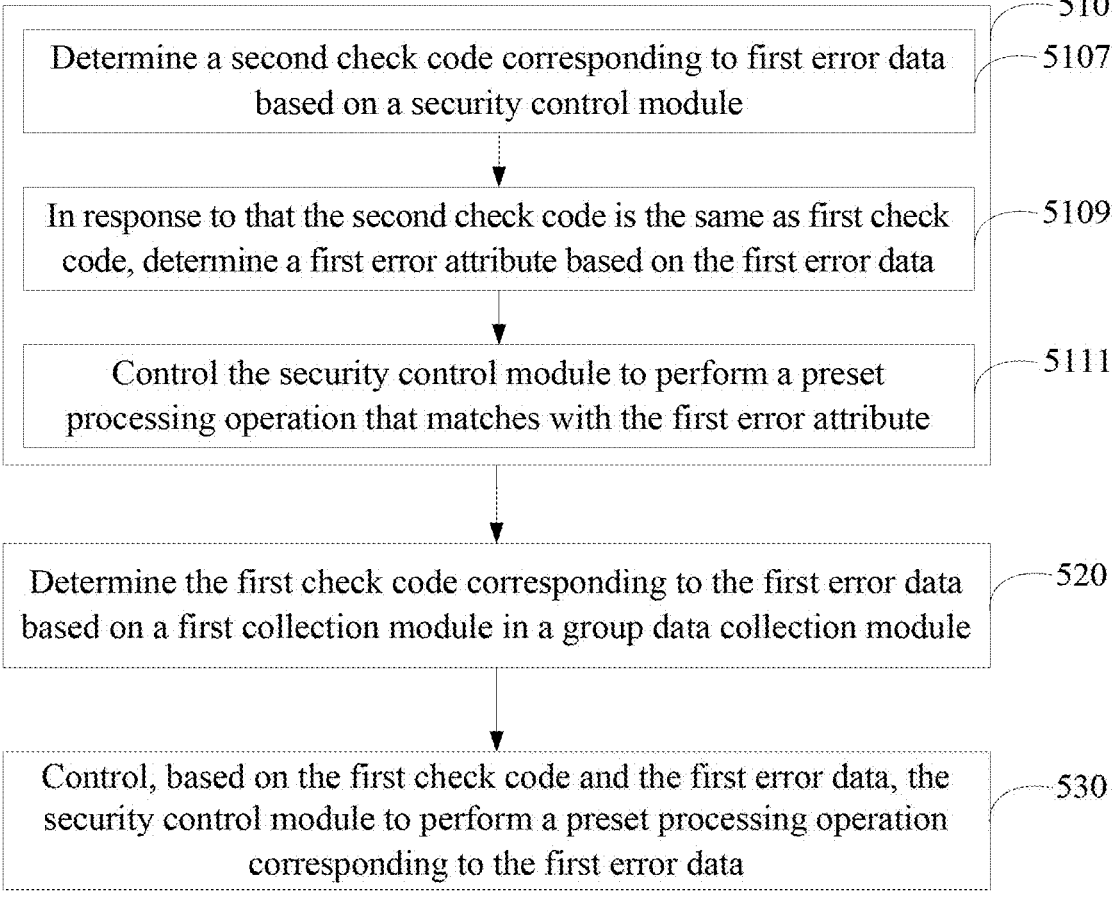

Determine a second check code corresponding to first error data based on a security control module ⌐—510 / 5107

In response to that the second check code is the same as first check code, determine a first error attribute based on the first error data ⌐—5109

Control the security control module to perform a preset processing operation that matches with the first error attribute ⌐—5111

Determine the first check code corresponding to the first error data based on a first collection module in a group data collection module ⌐—520

Control, based on the first check code and the first error data, the security control module to perform a preset processing operation corresponding to the first error data ⌐—530

Fig.7

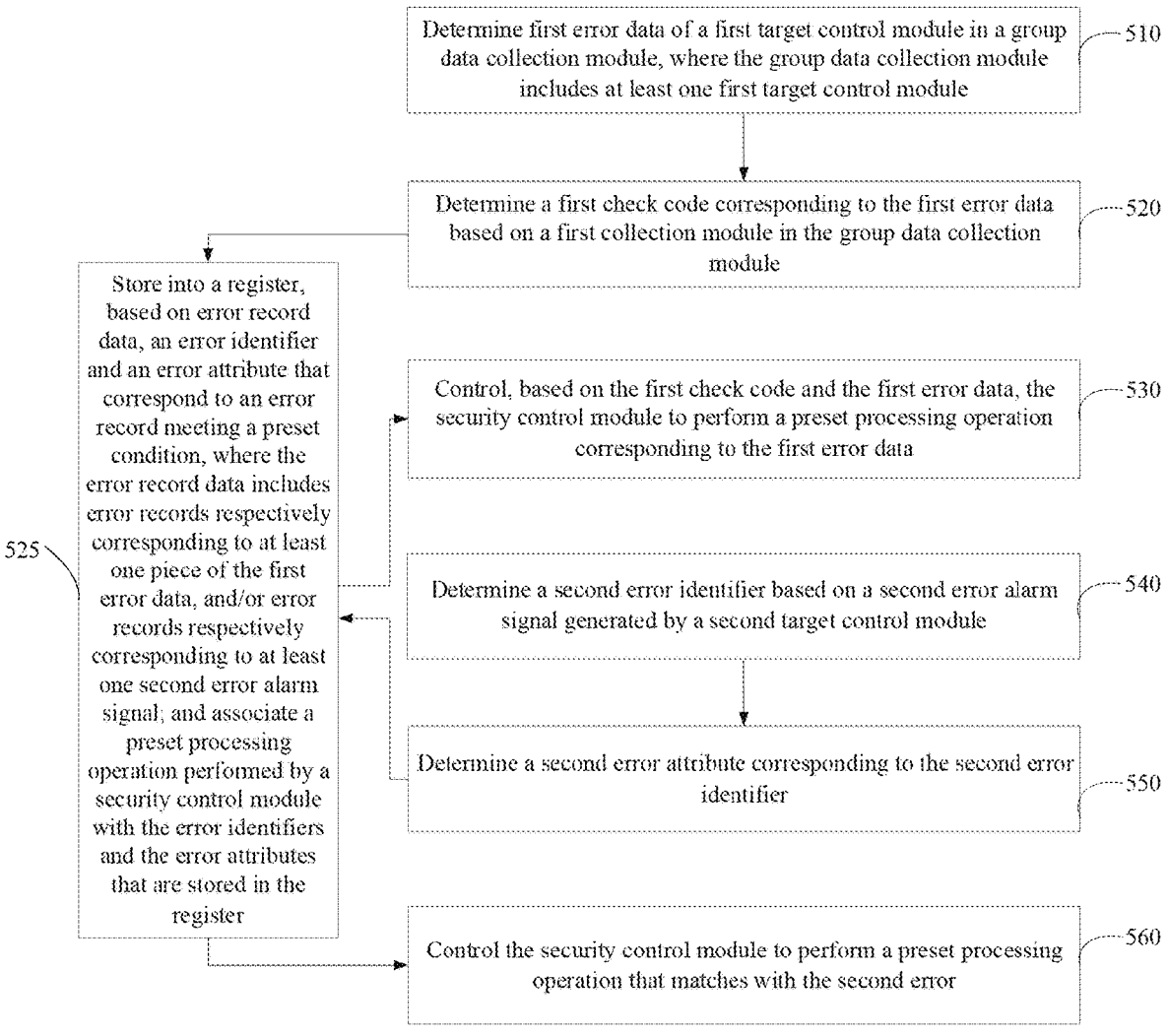

Determine first error data of a first target control module in a group data collection module, where the group data collection module includes at least one first target control module —510

Determine a first check code corresponding to the first error data based on a first collection module in the group data collection module —520

Store into a register, based on error record data, an error identifier and an error attribute that correspond to an error record meeting a preset condition, where the error record data includes error records respectively corresponding to at least one piece of the first error data, and/or error records respectively corresponding to at least one second error alarm signal, and associate a preset processing operation performed by a security control module with the error identifiers and the error attributes that are stored in the register —525

Control, based on the first check code and the first error data, the security control module to perform a preset processing operation corresponding to the first error data —530

Determine a second error identifier based on a second error alarm signal generated by a second target control module —540

Determine a second error attribute corresponding to the second error identifier —550

Control the security control module to perform a preset processing operation that matches with the second error —560

Fig.8

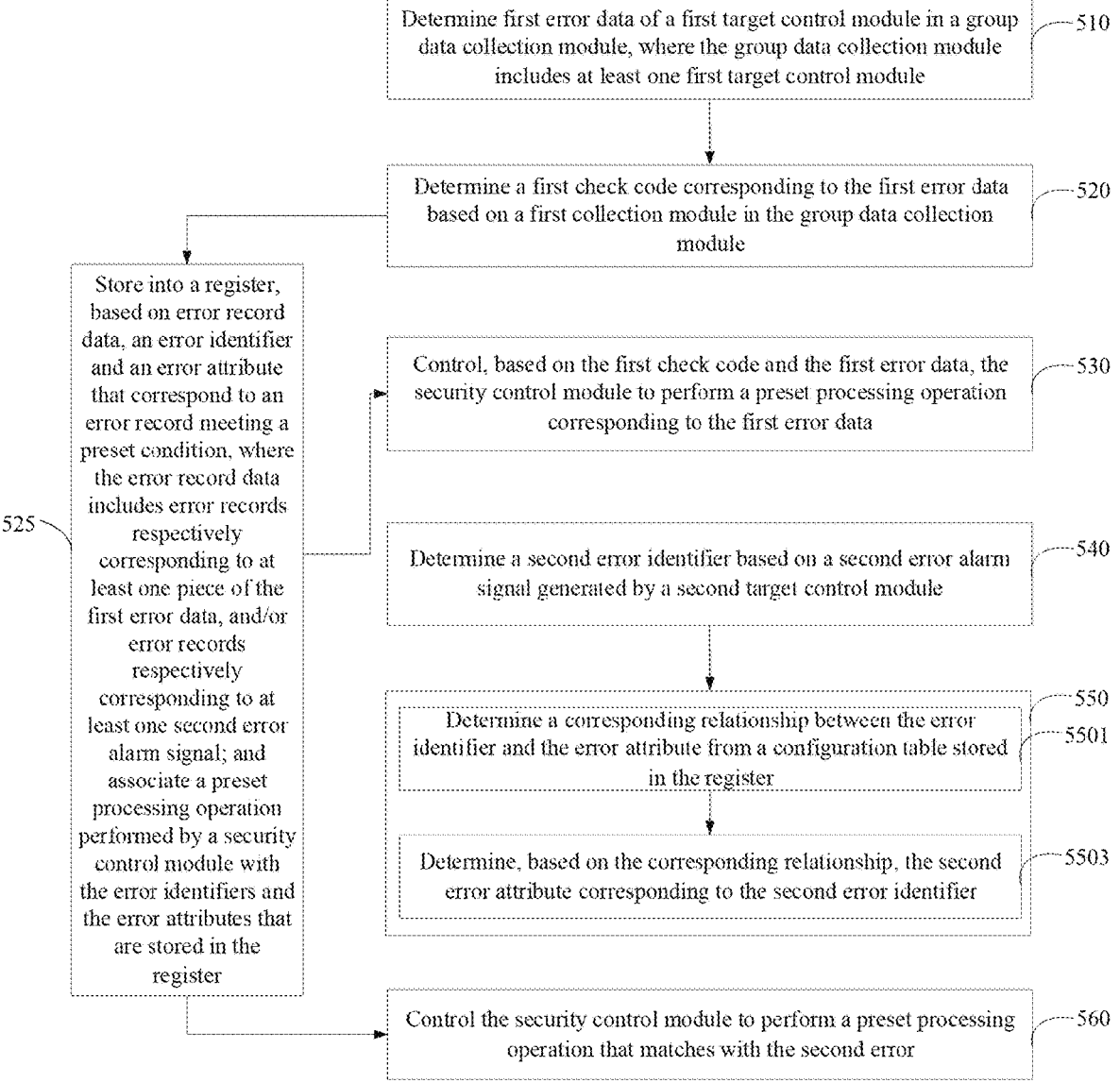

Determine first error data of a first target control module in a group data collection module, where the group data collection module includes at least one first target control module ⌐510

Determine a first check code corresponding to the first error data based on a first collection module in the group data collection module ⌐520

Store into a register, based on error record data, an error identifier and an error attribute that correspond to an error record meeting a preset condition, where the error record data includes error records respectively corresponding to at least one piece of the first error data, and/or error records respectively corresponding to at least one second error alarm signal; and associate a preset processing operation performed by a security control module with the error identifiers and the error attributes that are stored in the register

525

Control, based on the first check code and the first error data, the security control module to perform a preset processing operation corresponding to the first error data ⌐530

Determine a second error identifier based on a second error alarm signal generated by a second target control module ⌐540

Determine a corresponding relationship between the error identifier and the error attribute from a configuration table stored in the register ⌐550 ⌐5501

Determine, based on the corresponding relationship, the second error attribute corresponding to the second error identifier ⌐5503

Control the security control module to perform a preset processing operation that matches with the second error ⌐560

Fig.9

SECURITY CONTROL METHOD AND APPARATUS FOR INTEGRATED CIRCUIT, STORAGE MEDIUM, AND ELECTRONIC DEVICE

RELATED APPLICATION INFORMATION

This application claims priority to Chinese patent application Ser. No. 202211499525.5 filed on Nov. 28, 2022, entitled "SECURITY CONTROL METHOD AND APPRATUS FOR INTEGRATED CIRCUIT, STORAGE MEDIUM, AND ELECTRONIC DEVICE", all of which is incorporated herein by reference in their entirety.

FIELD OF THE INVENTION

The present disclosure relates to technologies of integrated circuits, and in particular, to a security control method and apparatus for an integrated circuit, a storage medium, and an electronic device.

BACKGROUND OF THE INVENTION

To ensure normal and reliable work of an integrated circuit, it is needed to collect and process errors that occur in the integrated circuit. Currently, there is an architecture for collecting and processing error data for the integrated circuit. However, this architecture cannot support collection and processing of a huge number of error data for the integrated circuit.

SUMMARY OF THE INVENTION

To resolve a problem that the foregoing architecture cannot support collection and processing of a huge number of error data for an integrated circuit, the present disclosure is proposed. Embodiments of the present disclosure provide a security control method and apparatus for an integrated circuit, a storage medium, and an electronic device.

According to an aspect of the embodiments of the present disclosure, a security control method for an integrated circuit is provided, including:

determining first error data of a first target control module in a group data collection module, wherein the group data collection module includes at least one first target control module;

determining a first check code corresponding to the first error data based on a first collection module in the group data collection module; and controlling, based on the first check code and the first error data, a security control module to perform a preset processing operation corresponding to the first error data.

According to another aspect of the embodiments of the present disclosure, a security control apparatus for an integrated circuit, including a group data collection module and a security control module, wherein the group data collection module includes a first collection module and at least one first target control module connected to the first collection module, and the security control module is connected to the first collection module;

the first collection module is configured to determine first error data of the first target control module, and determine a first check code corresponding to the first error data; and the security control module is configured to perform a preset processing operation corresponding to the first error data based on the first check code and the first error data.

According to still another aspect of the present disclosure, a computer readable storage medium is provided, wherein the storage medium stores a computer program, and the computer program is used for implementing the security control method for an integrated circuit described above.

According to yet another aspect of the present disclosure, an electronic device is provided, wherein the electronic device includes:

a processor; and a memory, configured to store processor-executable instructions, wherein the processor is configured to read the processor-executable instructions from the memory, and execute the processor-executable instructions to implement the security control method for an integrated circuit described above.

According to the security control method and apparatus for an integrated circuit, the storage medium, and the electronic device that are provided in the foregoing embodiments of the present disclosure, several first target control modules are disposed in a same group data collection module, and error data and a check code are provided to the security control module by using the first collection module in the group data collection module, so that the error data may be collected and processed. Moreover, the security control module does not need to be connected to all the first target control modules respectively, but only needs to be connected to the first collection module. In this way, a quantity of wires that need to be disposed on the security control module may be effectively controlled when the error data is collected and processed. Therefore, the embodiments of the present disclosure can support collection and processing of a huge number of error data for the integrated circuit.

The technical solutions of the present disclosure are further described below in detail with reference to the accompanying drawings and the embodiments.

BRIEF DESCRIPTION OF THE DRAWINGS

By describing the embodiments of the present disclosure more detailed with reference to the accompanying drawings, the foregoing and other objectives, features, and advantages of the present disclosure will become more apparent. The accompanying drawings are used to provide further understanding of the embodiments of the present disclosure, constitute a part of the specification, and are used to explain the present disclosure together with the embodiments of the present disclosure, but do not constitute limitation to the present disclosure. In the accompanying drawings, the same reference numerals generally represent the same components or steps.

FIG. 5 is a schematic flowchart of a security control method for an integrated circuit according to an exemplary embodiment of the present disclosure.

FIG. 6 is a schematic flowchart of a security control method for an integrated circuit according to another exemplary embodiment of the present disclosure.

FIG. 7 is a schematic flowchart of a security control method for an integrated circuit according to still another exemplary embodiment of the present disclosure.

FIG. 8 is a schematic flowchart of a security control method for an integrated circuit according to yet another exemplary embodiment of the present disclosure.

FIG. 9 is a schematic flowchart of a security control method for an integrated circuit according to still yet another exemplary embodiment of the present disclosure.

DETAILED DESCRIPTION OF THE EMBODIMENTS

Figure 1:
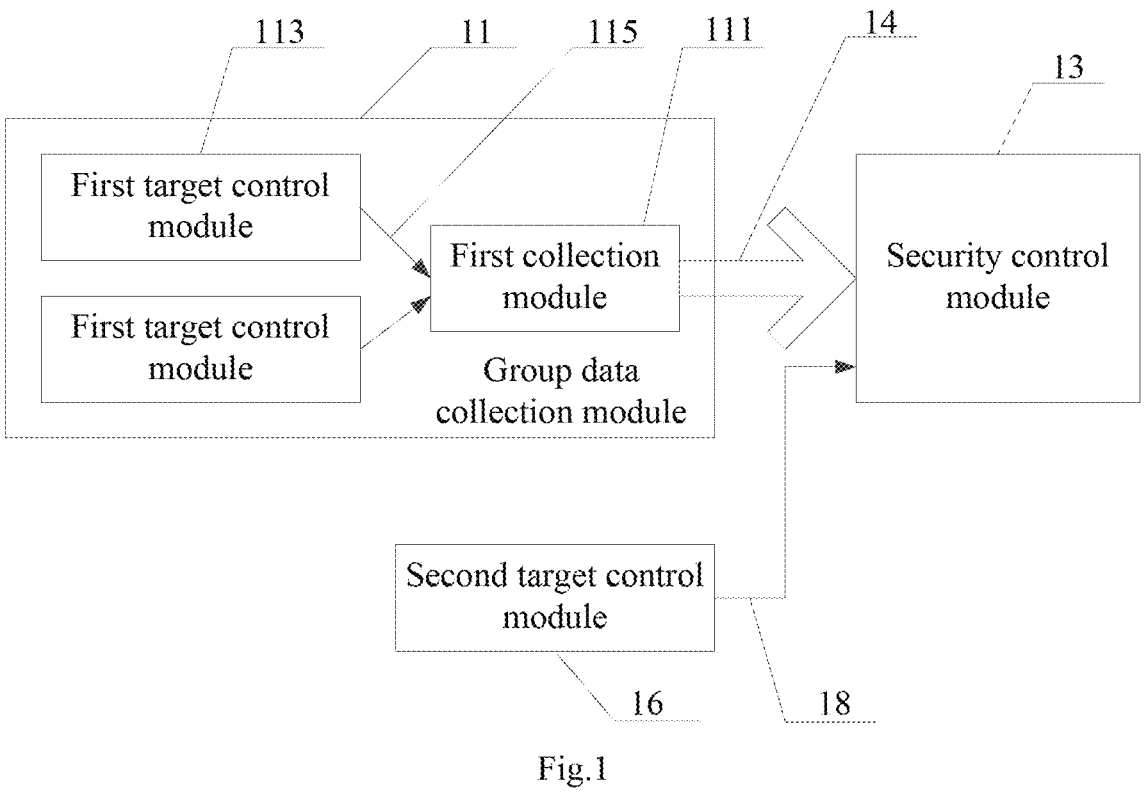
FIG. 1 is a schematic diagram of a structure of a security control apparatus for an integrated circuit according to an exemplary embodiment of the present disclosure.

Exemplary embodiments of the present disclosure are described below in detail with reference to the accompanying drawings. Obviously, the described embodiments are merely a part, rather than all of embodiments of the present disclosure. It should be understood that the present disclosure is not limited by the exemplary embodiments described herein.

It should be noted that unless otherwise specified, the scope of the present disclosure is not limited by numeric expressions, numerical values, and relative arrangement of components and steps described in these embodiments.

A person skilled in the art may understand that the terms such as "first" and "second" in the embodiments of the present disclosure are merely configured to distinguish between different steps, devices, or modules, and indicate neither any particular technical meaning, nor necessarily logical ordering among them.

It should be further understood that, in the embodiments of the present disclosure, the term "multiple"/"a plurality of" may refer to two or more; and the term "at least one" may refer to one, two, or more.

The embodiments of the present disclosure may be applicable to a terminal device, a computer system, a server, and other electronic devices, which may be operated together with numerous other general-purpose or special-purpose computing system environments or configurations. It should be noted that the electronic device may include a chip, and the chip may include at least one integrated circuit and a plurality of processors. Various electrical connections involved in the embodiments of the present disclosure may all be implemented within the chip, and all operations involved in the embodiments of the present disclosure may be completed within the chip. Well-known examples of a terminal device, a computing system, and environment and/or configuration applicable to be used with the terminal device, the computer system, the server, and other electronic devices include but are not limited to: a personal computer system, a server computer system, a thin client, a thick client, a handheld or laptop device, a microprocessor-based system, a set-top box, programmable consumer electronics, a network personal computer, a small computer system, a mainframe computer system, and a distributed cloud computing technology environment including any of the foregoing systems.

Application Overview

To ensure normal and reliable work of an integrated circuit, it is needed to collect and process errors that occur in the integrated circuit. The integrated circuit may include a plurality of intellectual property (IP) modules (that is, pre-designed modules with certain functions). The errors that occur in the integrated circuit may include random errors, permanent failure errors, and the like that occur in the functional safety-related IP module in the integrated circuit.

Currently, there is an architecture for collecting and processing error data for the integrated circuit. Under this architecture, the error data of all functional safety-related IP modules in the integrated circuit is directly reported to a particular module for error processing. As a result, a large amount of wires need to be disposed on the module. However, space available for disposing the wires in the module is usually limited, so that disposing of a large amount of wires cannot be supported. Therefore, this architecture cannot support collection and processing of a huge number of error data for the integrated circuit.

Exemplary Apparatus

FIG. 1 is a schematic diagram of a structure of a security control apparatus for an integrated circuit according to an exemplary embodiment of the present disclosure. The apparatus shown in FIG. 1 includes a group data collection module 11 and a security control module 13.

The group data collection module 11 includes a first collection module 111 and at least one first target control module 113 connected to the first collection module 111. The security control module 13 is connected to the first collection module 111.

The first collection module 111 is configured to determine first error data of the first target control module 113, and determine a first check code corresponding to the first error data.

The security control module 13 is configured to perform a preset processing operation corresponding to the first error data based on the first check code and the first error data.

Optionally, there may be one, two, three, or more group data collection modules 11, which are not enumerated herein.

Optionally, there may be two, three, four, or more first target control modules 113 in the group data collection module 11, which are not enumerated herein. Any two first target control modules 113 in the group data collection module 11 may satisfy at least one of the following four conditions.

(1) The two first target control modules 113 are in a same subsystem of the integrated circuit.

(2) The two first target control modules 113 work together to support a same function.

(3) A quantity of connection lines between the two first target control modules 113 is greater than a preset quantity.

(4) Positions for placing the two first target control modules 113 satisfy a preset relationship.

In an example, if M functional safety-related IP modules in the integrated circuit are all in an awareness subsystem of the integrated circuit or are all in a computing subsystem of the integrated circuit, the M IP modules may be classified into the same group data collection module 11. Moreover, each of the M IP modules may serve as a first target control module 113.

In another example, if N functional safety-related IP modules in the integrated circuit work together to implement an environment awareness function or a computing function, the N IP modules may be classified into the same group data collection module 11. Moreover, each of the N IP modules may serve as a first target control module 113.

In still another example, if a quantity of connection lines between certain two functional safety-related IP modules in the integrated circuit is greater than the preset quantity (for example, is greater than 3), it indicates that the two IP modules need to interact with each other relatively frequently. In this case, the two IP modules may be classified into the same group data collection module 11. Moreover, each of the two IP modules may serve as a first target control module 113.

In yet another example, if positions for placing K functional safety-related IP modules in the integrated circuit are very close; for example, the K IP modules are all located in a small area in the integrated circuit, it may be determined that the positions for placing the K IP modules satisfy the preset relationship, and the K IP modules may be classified into the same group data collection module 11. Moreover, each of the K IP modules may serve as a first target control module 113.

Figure 2:
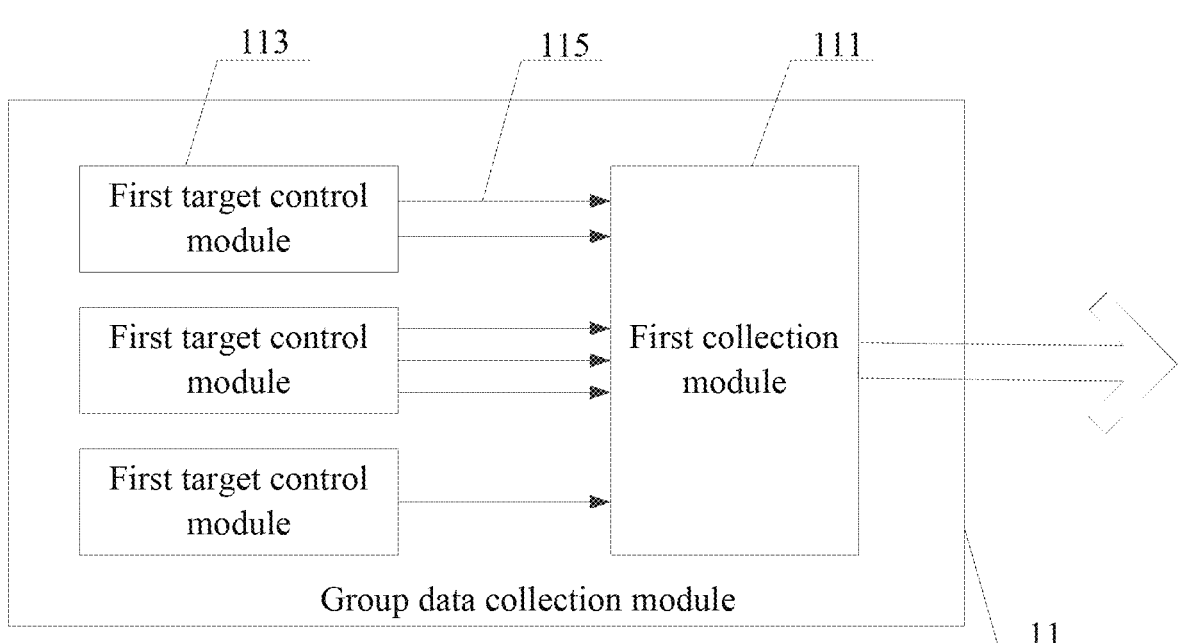
FIG. 2 is a schematic diagram of a structure of a group data collection module in a security control apparatus for an integrated circuit according to an exemplary embodiment of the present disclosure.

Optionally, as shown in FIG. 1 and FIG. 2, the first target control module 113 in the group data collection module 11 may be electrically connected to the first collection module 111 in the group data collection module 11 by using one or more first error alarm lines 115.

The first collection module 111 may determine the first error data of the first target control module 113 based on a signal transmitted in the first error alarm line 115 between the first target control module 113 and the first collection module 111. Subsequently, the first collection module 111 may perform a preset check operation on the first error data to obtain the first check code corresponding to the first error data.

Optionally, the preset check operation includes, but are not limited to, a cyclic redundancy check (CRC) operation, an error checking and correcting (ECC) operation, and a parity check operation, which are not enumerated herein.

In an example, if the preset check operation is the CRC operation, the first collection module 111 may perform the CRC operation on the first error data according to a preset CRC polynomial, to obtain a corresponding CRC value. The CRC value may be taken as the first check code.

In another example, if the preset check operation is the ECC operation, the first collection module 111 may generate a row check value and a column check value for every 256 bits of data in the first error data. An ECC check code may be generated by using the row check value and the column check value that are generated. The generated ECC check code may be taken as the first check code.

Optionally, as shown in FIG. 1, the first collection module 111 may be electrically connected to the security control module 13 by using a data bus 14. In this way, the first collection module 111 may provide the first error data and the first check code to the security control module 13 by using the data bus 14.

The security control module 13 may perform the preset processing operation corresponding to the first error data based on the first error data and the first check code. The preset processing operation corresponding to the first error data includes, but is not limited to, an operation of outputting an error code (such as an operation of setting an error pin), an operation of outputting a reset request, and an operation of outputting an interrupt signal.

According to the security control apparatus for an integrated circuit provided in this embodiment of the present disclosure, several first target control modules 113 are disposed in a same group data collection module 11, and error data and a check code are provided to the security control module 13 by using the first collection module 111 in the group data collection module 11, so that the error data may be collected and processed. Moreover, the security control module 13 does not need to be connected to all the first target control modules 113 respectively, but only needs to be connected to the first collection module 111. In this way, a quantity of wires that need to be disposed on the security control module 13 may be effectively controlled when the error data is collected and processed. Therefore, this embodiment of the present disclosure can support collection and processing of a huge number of error data for the integrated circuit.

In an optional example, the first collection module 111 is configured to determine a first error identifier based on a first error alarm signal generated by the first target control module 113, determine a first error attribute corresponding to the first error identifier, and determine the first error data based on the first error identifier and the first error attribute.

Optionally, a configuration table (for ease of description, which is referred to as a first configuration table in the following) may be stored in the first collection module 111. A corresponding relationship (for ease of description, which is referred to as a first corresponding relationship in the following) between an error identifier and an error attribute may be recorded in the first configuration table. The error identifier may include an error ID. The error attribute may include an error severity level, an error urgency level, an expected error processing manner, and the like. The error severity level includes, but is not limited to, very severe, severe, generally severe, and not severe. The error urgency level includes, but is not limited to, very urgent, urgent, generally urgent, and not urgent. The expected error processing manner includes, but is not limited to, outputting an error code, resetting and interrupting.

It should be noted that various possible errors may occur to the first target control module 113, including but not limited to a power error, a clock error, and an electro magnetic compatibility (EMC) interference error. In this way, when the first target control module 113 is electrically connected to the first collection module 111 by using a plurality of first error alarm lines 115, different first error alarm lines 115 may be configured to transmit first error alarm signals corresponding to different errors of the first target control module 113.

In an example, the first target control module 113 may be electrically connected to the first collection module 111 by using three first error alarm lines 115. A first first error alarm line 115 may be configured to transmit the first error alarm signal corresponding to a power error of the first target control module 113. A second first error alarm line 115 may be configured to transmit the first error alarm signal corresponding to a clock error of the first target control module 113. A third first error alarm line 115 may be configured to transmit the first error alarm signal corresponding to an EMC interference error of the first target control module 113. In this way, a corresponding relationship (for ease of description, which is referred to as a second corresponding relationship in the following) between each first error alarm line 115 and an error identifier of the corresponding error may be pre-determined and recorded.

After the first error alarm signal from the first target control module 113 is received by using a certain first error alarm line 115, the first collection module 111 may determine, based on the second corresponding relationship, an error identifier corresponding to the first error alarm line 115 that receives the first error alarm signal. The determined error identifier may serve as the first error identifier.

Certainly, a determining manner for the first error identifier is not limited thereto. For example, the first error alarm signal may carry an error identifier, and the first collection module 111 may directly extract the error identifier from the first error alarm signal to serve as the first error identifier.

After the first error identifier is determined, the first collection module 111 may determine the first error attribute corresponding to the first error identifier based on the first corresponding relationship in the first configuration table, so as to generate the first error data including the first error attribute and the first error identifier. Certainly, the first error data may also include other information, such as generation time of the first error alarm signal.

In this embodiment of the present disclosure, the first error identifier may be efficiently and reliably determined based on the first error alarm signal generated by the first target control module 113. By determining the first error attribute corresponding to the first error identifier, reference may be made to the first error identifier and the first error attribute to efficiently and reliably determine the first error data. The first error data may not only indicate an error source (which is specifically indicated by using the first error identifier), but may also indicate the error attribute. In this way, for the IP module classified into the group data collection module 11, the security control module 13 may quickly and accurately process an error occurring in the IP module, without locating an error source through software readback; and may also process the error occurring in the IP module by using an appropriate processing strategy (such as an appropriate processing method, or appropriate processing timing).

In an optional example, the security control module 13 is configured to determine a second check code corresponding to the first error data; in response to that the second check code is the same as the first check code, determine the first error attribute based on the first error data; and perform a preset processing operation that matches with the first error attribute.

After the first error data and the first check code are provided to the security control module 13 by the first collection module 111 by using the data bus 14, the security control module 13 may perform a preset check operation on the first error data provided by the first collection module 111, to obtain the second check code corresponding to the first error data. For a specific manner of obtaining the second check code, reference may be made to the introduction to the manner of obtaining the first check code that is described above, and details are not described herein.

The security control module 13 may compare the second check code with the first check code to determine whether the second check code is the same as the first check code.

If the second check code is the same as the first check code, it indicates that no error occurs in a process of transmitting the first error data from the first collection module 111 to the security control module 13, and the first error data received by the security control module 13 is authentic and reliable. In this case, the security control module 13 may extract the first error attribute from a parsing result by parsing the first error data, and perform the preset processing operation that matches with the first error attribute. For example, if an error urgency level in the first error attribute is very urgent, and an expected error processing manner in the first error attribute is outputting an error code, the security control module 13 may immediately perform an operation of outputting the check code. For another example, if an error severity level in the first error attribute is severe, and the expected error processing manner in the first error attribute is resetting, the security control module 13 may perform an operation of outputting a reset request after another very severe error is processed.

If the second check code is different from the first check code, it indicates that an error occurs in a process of transmitting the first error data from the first collection module 111 to the security control module 13, and the first error data received by the security control module 13 is not authentic and reliable enough. In this case, the security control module 13 is not required to perform the preset processing operation that matches with the first error attribute.

In this embodiment of the present disclosure, the second check code corresponding to the first error data is determined and a second check value is compared with a first check value, so that whether the first error data has an error during transmission may be efficiently and reliably determined. The security control module 13 may perform the preset processing operation that matches with the first error attribute merely when no error occurs. In this way, authenticity and reliability of the first error attribute that is referred to when the security control module 13 performs error processing can be effectively ensured, thereby helping to ensure error processing effects.

In an optional example, as shown in FIG. 1, the security control apparatus for an integrated circuit further includes a second target control module 16.

The security control module 13 is connected to the second target control module 16.

The security control module 13 is configured to determine a second error identifier based on a second error alarm signal generated by the second target control module 16, determine a second error attribute corresponding to the second error identifier, and perform a preset processing operation that matches with the second error attribute.

Optionally, each of the functional safety-related IP modules in the integrated circuit that are not classified into the group data collection module 11 may serve as a second target control module 16. There may be one, two, three, or more second target control modules 16, which are not enumerated herein.

Optionally, the second target control module 16 may be electrically connected to the security control module 13 by using one or more second error alarm lines 18.

It should be noted that, similar to the first target control module 113, various possible errors may also occur to the second target control module 16. In this case, when the second target control module 16 is electrically connected to the security control module 13 by using a plurality of second error alarm lines 18, different second error alarm lines 18 may be configured to transmit second error alarm signals corresponding to different errors of the second target control module 16.

After the second error alarm signal is received by the security control module 13 by using a certain second error alarm line 18, the second error identifier and the second error attribute may be determined sequentially. For a specific determining manner, reference may be made to the introduction to the manner of determining the first error identifier and the first error attribute that is described above, and details are not described herein. Subsequently, the security control module 13 may perform the preset processing operation that matches with the second error attribute. For the preset processing operation that matches with the second error attribute, reference may be made to the introduction to the preset processing operation that matches with the first error attribute that is described above, and details are not described herein.

In this embodiment of the present disclosure, the second error identifier may be efficiently and reliably determined based on the second error alarm signal generated by the second target control module 16. By determining the second error attribute corresponding to the second error identifier, the preset processing operation that matches with the second error attribute may be performed. In this way, for a functional safety-related IP module in the integrated circuit that is not classified into the group data collection module 11, an error occurring in the IP module may be processed quickly and accurately, without locating an error source through software readback. Moreover, the error occurring in the IP module can be processed by using an appropriate processing strategy, thereby ensuring error processing effects.

Figure 3:
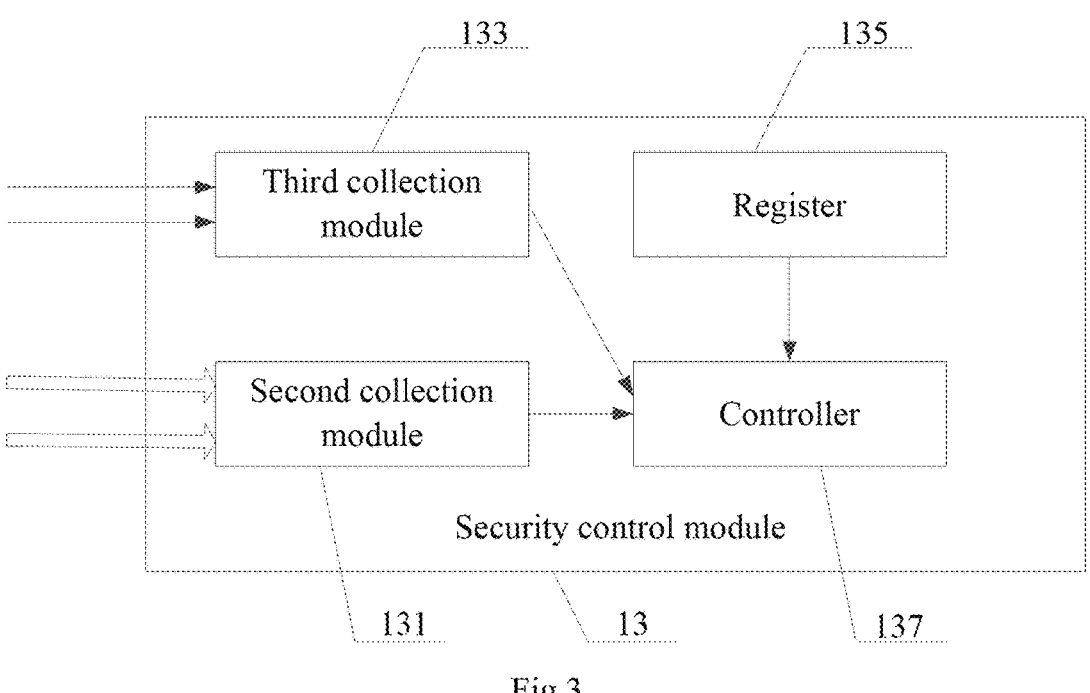
FIG. 3 is a schematic diagram of a structure of a security control module in a security control apparatus for an integrated circuit according to an exemplary embodiment of the present disclosure.

In an optional example, as shown in FIG. 3, the security control module 13 includes a second collection module 131, a third collection module 133, a register 135, and a controller 137 that is configured to perform the preset processing operation.

The second collection module 131 is connected to the first collection module 111, and is configured to receive the first error data and the first check code.

The third collection module 133 is connected to the second target control module 16, and is configured to receive the second error alarm signal.

The controller 137 is respectively connected to the second collection module 131, the third collection module 133, and the register 135.

The controller 137 is configured to store into the register 135, based on error record data, an error identifier and an error attribute that correspond to an error record meeting a preset condition. The error record data includes error records respectively corresponding to at least one piece of the first error data, and/or error records respectively corresponding to at least one second error alarm signal. The preset processing operation performed by the controller 137 is associated with the error identifiers and the error attributes that are stored in the register 135.

Optionally, the second collection module 131 may be electrically connected to the first collection module 111 by using the data bus 14, and the third collection module 133 may be electrically connected to the second target control module 16 by using the second error alarm line 18.

Optionally, the controller 137 may include a first connection port, a second connection port, and a third connection port. The first connection port may be electrically connected to the second collection module 131, the second connection port may be electrically connected to the third collection module 133, and the third connection port may be electrically connected to the register 135.

In this way, the second collection module 131 can collect a large number of first error data from the first collection module 111, and provide all the collected first error data to the controller 137. The third collection module 133 can collect a large amount of second error alarm signals from the second target control module 16, and provide all the collected second error alarm signals to the controller 137. The controller 137 may generate the error record data based on the data and the information that are provided by the second collection module 131 and the third collection module 133. The error record data may include error records respectively corresponding to a plurality of pieces of first error data, and error records respectively corresponding to a plurality of second error alarm signals.

It should be noted that the error record corresponding to any first error data may include the first error identifier and the first error attribute in the first error data; and the error record corresponding to any second error alarm signal may include the second error identifier that is determined based on the second error alarm signal, and the second error attribute corresponding to the second error identifier. In other words, any error record includes an error identifier and a corresponding error attribute.

The controller 137 may select the error record meeting the preset condition from the error record data according to a preset rule. For example, a priority order including a plurality of error identifiers may be set. A higher error identifier indicates a higher priority of an error corresponding to the error identifier, while a lower error identifier indicates a lower priority of an error corresponding to the error identifier. An error record in which an error identifier at a first position in the priority order is located may be used as the error record meeting the preset condition. Optionally, after the error record in which the error identifier at the first position in the priority order is located is used as the error record meeting the preset condition, the error identifier may be adjusted from the first position to a last position in the priority order. In this way, when error records meeting the preset condition are selected from the error record data for a plurality of times, the error record selected each time may be different.

It should be noted that the preset rule is not limited to the foregoing situation. For example, the controller 137 may preferentially take an error record with an error urgency level of very urgent in the error attribute as the error record meeting the preset condition, or preferentially take an error record with an error severity level of very severe in the error attribute as the error record meeting the preset condition.

After the error record meeting the preset condition is selected, the controller 137 may store the error identifier and the error attribute in the selected error record into the register 135, and an error corresponding to the error identifier and the error attribute that are stored in the register 135 may be used as a current to-be-processed error. That the preset processing operation performed by the controller 137 is associated with the error identifiers and the error attributes that are stored in the register 135 may be understood as: the controller 137 performs an appropriate preset processing operation on the current to-be-processed error, thereby processing the error.

In an Optional Implementation:

The controller 137 is configured to, in response to the first error data corresponding to the error identifiers and the error attributes that are stored in the register 135, perform the preset processing operation corresponding to the first error data based on the first check code and the first error data.

the controller 137 is configured to, in response to the second error alarm signal corresponding to the error identifiers and the error attributes that are stored in the register 135, perform the preset processing operation that matches with the second error attribute.

If the error identifiers and the error attributes that are stored in the register 135 correspond to the first error data, it indicates that the current to-be-processed error is an error occurring in the first target control module 113 in the group data collection module 11. In this case, the controller 137 may perform the preset processing operation corresponding to the first error data based on the first check code and the first error data, to process the error occurring in the first target control module 113. For a specific processing process, reference may be made to the relevant introduction described above, and details are not described herein again.

If the error identifiers and the error attributes that are stored in the register 135 correspond to the second error alarm signal, it indicates that the current to-be-processed error is an error occurring in a certain second target control module 16. In this case, the controller 137 may perform the preset processing operation that matches with the second error attribute, to process the error occurring in the second target control module 16. For a specific processing process, reference may be made to the relevant introduction described above, and details are not described herein again.

In this way, referring to information stored in the register 135, the controller 137 can orderly process, in a timely and effective manner, errors of all functional safety-related IP modules in the integrated circuit that have errors.

In this embodiment of the present disclosure, the security control module 13 includes the second collection module 131, the third collection module 133, the register 135, and the controller 137. The security control module 13 has a relatively simple structure. Moreover, through collaborative work of the second collection module 131, the third collection module 133, and the controller 137, a large amount of error-related information may be collected and aggregated to form the error record data. By storing specific error identifiers and error attributes into the register 135 based on the error record data, the controller 137 may process the errors orderly.

Figure 4:
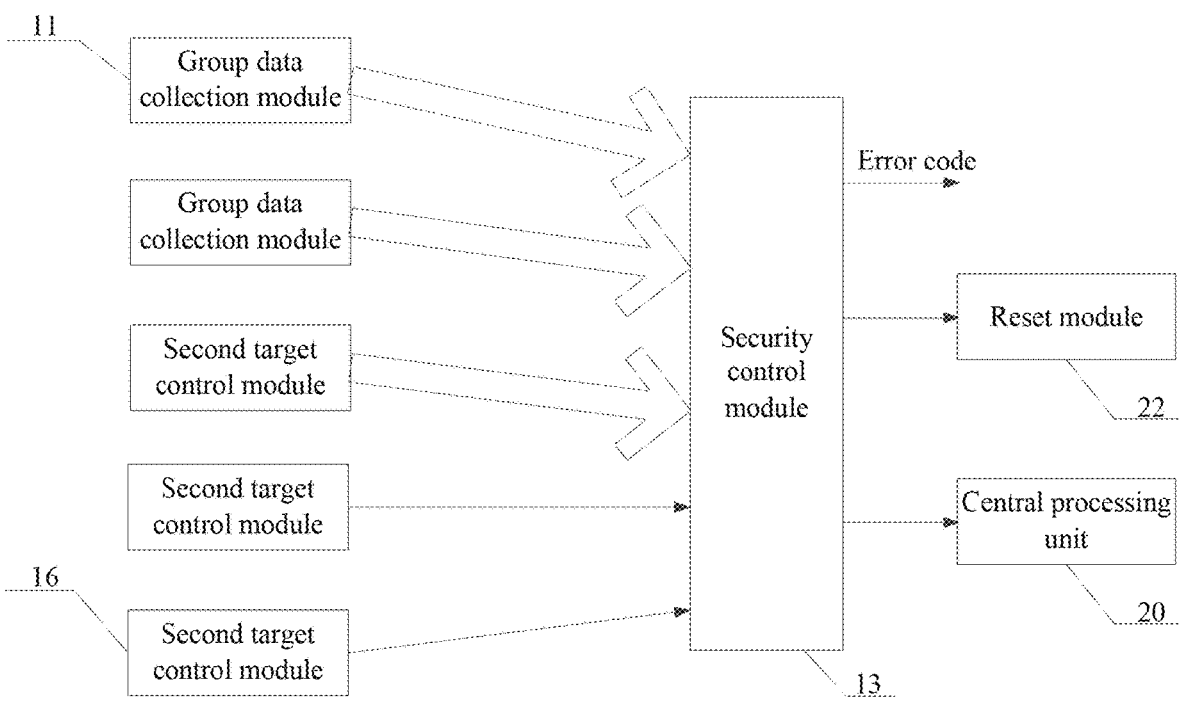
FIG. 4 is a schematic diagram of a structure of a security control apparatus for an integrated circuit according to another exemplary embodiment of the present disclosure.

In an optional example, as shown in FIG. 4, the security control apparatus for an integrated circuit further includes a central processing unit 20.

The central processing unit 20 is connected to the controller 137 in FIG. 3, and the preset processing operation includes an operation of sending an interrupt signal to the central processing unit 20.

The central processing unit 20 is configured to read, in response to the interrupt signal, the error identifiers and the error attributes that are stored in the register 135 in FIG. 3, and perform interrupt processing based on a reading result.

Optionally, the register 135 may be configured through software. The information stored in the register 135 may be accessed by the central processing unit 20, and would not be cleared due to reset of the integrated circuit.

For the current to-be-processed error, if it is assumed that the preset processing operation performed by the controller 137 includes the operation of sending the interrupt signal to the central processing unit 20, after receiving the interrupt signal, the central processing unit 20 may determine which type of error the current to-be-processed error is, where the error source is, the error severity level, the error emergency level, and other information by reading the error identifier and the error attribute that are stored in the register 135. The central processing unit 20 may enter an interrupt processing program on this basis. Specifically, the central processing unit 20 may pause a program that is being executed when the interrupt signal is received, and refer to a running status of an application program associated with the error source to determine a next processing manner. The processing manner includes, but is not limited to, outputting an error code, resetting, resending data, recording a quantity of errors, and discarding data. The central processing unit 20 may perform corresponding processing according to the determined processing manner. After the processing is completed, the central processing unit 20 may restore to perform the program that is previously paused.

In this embodiment of the present disclosure, through the setting of the central processing unit 20, the current to-be-processed error may be processed efficiently and reliably in an interrupt manner through the collaborative work of the central processing unit 20, the controller 137, and the register 135.

In an optional example, as shown in FIG. 4, the security control apparatus for an integrated circuit may further include a reset module 22. The security control module 13 may send a reset instruction to the reset module 22. In response to the reset instruction, the reset module 22 may perform a reset operation on the entire integrated circuit, so that the current to-be-processed error may also be processed.

In an optional example, the controller 137 is configured to determine a corresponding relationship between the error identifier and the error attribute from a configuration table (for ease of description, which is referred to as a second configuration table in the following) stored in the register 135, and determine the second error attribute corresponding to the second error identifier based on the corresponding relationship (for ease of description, which is referred to as a third corresponding relationship in the following).

It should be noted that the second configuration table may be pre-stored in the register 135, and the third corresponding relationship may be stored in the second configuration table. For information in the third corresponding relationship, reference may be made to the introduction to the first corresponding relationship that is described above, and details are not described herein. In this way, the third corresponding relationship may be determined by reading the information in the second configuration table. With reference to the third corresponding relationship, the second error attribute corresponding to the second error identifier may be determined efficiently and reliably.

In an optional example, the controller 137 is configured to update the corresponding relationship (that is, the third corresponding relationship) in the configuration table, and determine the second error attribute corresponding to the second error identifier based on the updated corresponding relationship (that is, the third corresponding relationship).

It should be noted that in some cases, a user may require to update the third corresponding relationship. For example, the user may expect to change an error severity level, in the error attribute, that corresponds to a certain error identifier in the third corresponding relationship from generally severe to very severe, or change an expected error processing manner, in the error attribute, that corresponds to another error identifier in the third corresponding relationship from outputting an error code to resetting.

In a case where the third corresponding relationship needs to be updated, the user may initiate an information modification instruction to the controller 137. The controller 137 may modify corresponding information in the third corresponding relationship in response to the received information modification instruction, so as to update the third corresponding relationship. In this way, when the second error attribute is determined in the following by using the updated third corresponding relationship, the determined second error attribute can better meet requirements of the user.

It should be noted that, similar to the third corresponding relationship, the first corresponding relationship may also be updated according to requirements of the user.

In an optional example, as shown in FIG. 4, the architecture for collecting and processing error data provided in this embodiment of the present disclosure includes a plurality of group data collection modules 11, the security control module 13, a plurality of second target data collection modules 16, the central processing unit 20, and the reset module 22. Each group data collection module 11 includes the first collection module 111 and a plurality of first target control modules 113 that are shown in FIG. 1 and FIG. 2. The security control module 13 includes the second collection module 131, the third collection module 133, the register 135, and the controller 137 that are shown in FIG. 3.

In practical work, the first collection module 111 may collect an error ID, an error severity level, an error urgency level, an expected error processing manner, ECC check code (which may also be the CRC value described above, or a parity value obtained through the parity check operation described above), and other information (equivalent to the first error data and the first check code that are described above) of the first target control module 113, and send the same to the security control module 13. The second target control module 16 may directly send the respective error alarm signal (equivalent to the second error alarm signal described above) to the security control module 13.

The security control module 13, as a total error collection module, aggregates all relevant information about errors, and determines a next processing manner. For example, the security control module 13 notifies devices outside of a chip on which the integrated circuit is located through an operation of outputting an error code, or sends an interrupt signal to the central processing unit 20, or sends a reset request to the reset module 22.

The central processing unit 20 receives the interrupt signal from the security control module 13, and enters the interrupt processing program by reading the information stored in the register 135.

The reset module 22 receives the reset request from the security control module 13 to determine whether to reset the chip on which the integrated circuit is located.

In view of the above, the architecture provided in this embodiment of the present disclosure can support collection and processing of a huge number of error data for the integrated circuit, without positioning the error source through a plurality of software readback. In this case, a positioning speed is fast, and the architecture can be applied to chips having high requirements on real-time performance. Exemplary Method FIG. 5 is a schematic flowchart of a security control method for an integrated circuit according to an exemplary embodiment of the present disclosure. The method shown in FIG. 5 includes steps 510, 520, and 530. The steps are described below, respectively.

Step 510. Determine first error data of a first target control module in a group data collection module, where the group data collection module includes at least one first target control module.

Optionally, there may be one, two, three, or more group data collection modules, and there may be two, three, four, or more first target control modules in the group data collection module, which are not enumerated herein.

Step 520. Determine a first check code corresponding to the first error data based on a first collection module in the group data collection module.

Optionally, a preset check operation may be performed on the first error data to obtain the first check code corresponding to the first error data. The preset check operation includes, but is not limited to, an CRC operation and a parity check operation.

Step 530. Control, based on the first check code and the first error data, a security control module to perform a preset processing operation corresponding to the first error data.

Optionally, the preset processing operation corresponding to the first error data includes, but is not limited to, an operation of outputting an error code, an operation of outputting a reset request, and an operation of outputting an interrupt signal.

According to the security control method for an integrated circuit provided in this embodiment of the present disclosure, several first target control modules are disposed in a same group data collection module, and error data and a check code are provided to the security control module by using the first collection module in the group data collection module, so that the error data may be collected and processed. Moreover, the security control module does not need to be connected to all the first target control modules respectively, but only needs to be connected to the first collection module. In this way, a quantity of wires that need to be disposed on the security control module may be effectively controlled on the premise that the error data is collected and processed. Therefore, this embodiment of the present disclosure can support collection and processing of a huge number of error data for the integrated circuit.

On the basis of the embodiment shown in FIG. 5, as shown in FIG. 6, step 510 includes the following steps.

Step 5101. Determine a first error identifier based on a first error alarm signal generated by the first target control module.

Step 5103. Determine a first error attribute corresponding to the first error identifier.

Step 5105. Determine the first error data based on the first error identifier and the first error attribute.

It should be noted that for determining manners for the first error identifier, the first error attribute, and the first error data, reference may be made to the relevant introduction in the foregoing apparatus embodiment, and details are not described herein.

In this embodiment of the present disclosure, the first error identifier may be efficiently and reliably determined based on the first error alarm signal generated by the first target control module. By determining the first error attribute corresponding to the first error identifier, reference may be made to the first error identifier and the first error attribute to efficiently and reliably determine the first error data. The first error data may not only indicate an error source, but may also indicate the error attribute. In this way, for an IP module classified into the group data collection module, an error occurring in the IP module may be quickly and accurately processed, without positioning an error source through software readback; and the error occurring in the IP module may be processed by using an appropriate processing strategy.

On the basis of the embodiment shown in FIG. 5, as shown in FIG. 7, step 510 includes the following steps.

Step 5107. Determine a second check code corresponding to the first error data based on the security control module.

Step 5109. In response to that the second check code is the same as the first check code, determine a first error attribute based on the first error data.

Step 5111. Control the security control module to perform a preset processing operation that matches with the first error attribute.

It should be noted that for determining manners for the second check code and the first error attribute, and a type of the preset processing operation that matches with the first error attribute, reference may be made to the relevant introduction in the foregoing apparatus embodiment, and details are not described herein.

In this embodiment of the present disclosure, the second check code corresponding to the first error data is determined and a second check value is compared with a first check value, so that whether the first error data has an error during transmission may be efficiently and reliably determined. The security control module may perform the preset processing operation that matches with the first error attribute merely when no error occurs. In this way, authenticity and reliability of the first error attribute that is referred to when the security control module perform error processing can be effectively ensured, thereby helping to ensure error processing effects.

On the basis of the embodiment shown in FIG. 5, as shown in FIG. 8, the method further includes the following steps.

Step 540. Determine a second error identifier based on a second error alarm signal generated by a second target control module.

Step 550. Determine a second error attribute corresponding to the second error identifier.

Step 560. Control the security control module to perform a preset processing operation that matches with the second error.

It should be noted that for determining manners for the second error identifier and the second error attribute, and a type of the preset processing operation that matches with the second error attribute, reference may be made to the relevant introduction in the foregoing apparatus embodiment, and details are not described herein.

In this embodiment of the present disclosure, the second error identifier may be efficiently and reliably determined based on the second error alarm signal generated by the second target control module. By determining the second error attribute corresponding to the second error identifier, the preset processing operation that matches with the second error attribute may be performed. In this way, for a functional safety-related IP module in the integrated circuit that is not classified into the group data collection module, an error occurring in the IP module may be processed quickly and accurately, without positioning an error source through software readback. Moreover, the error occurring in the IP module can be processed by using an appropriate processing strategy, thereby ensuring error processing effects.

In an optional example, as shown in FIG. 8, the security control method for an integrated circuit further includes:

Step 525. Store into a register, based on error record data, an error identifier and an error attribute that correspond to an error record meeting a preset condition, where the error record data includes error records respectively corresponding to at least one piece of the first error data, and/or error records respectively corresponding to at least one second error alarm signal; and associate the preset processing operation performed by the security control module with the error identifiers and the error attributes that are stored in the register.

It should be noted that for information included in the error record data and the error record, and the preset condition, reference may be made to the relevant introduction in the foregoing apparatus embodiment, and details are not described herein.

In this embodiment of the present disclosure, a large amount of error-related information may be collected and aggregated to form the error record data. By storing specific error identifiers and error attributes into the register based on the error record data, errors may be processed orderly.

In an optional example, step 530 includes:

in response to the first error data corresponding to the error identifiers and the error attributes that are stored in the register, controlling, based on the first check code and the first error data, the security control module to perform the preset processing operation corresponding to the first error data.

Step 560 includes:

In response to the second error alarm signal corresponding to the error identifiers and the error attributes that are stored in the register, controlling the security control module to perform the preset processing operation that matches with the second error attribute.

In this embodiment of the present disclosure, referring to information stored in the register, errors of all functional safety-related IP modules in the integrated circuit that have errors may be orderly processed in a timely and effective manner.

On the basis of the embodiment shown in FIG. 8, as shown in FIG. 9, step 550 includes the following steps.

Step 5501. Determine a corresponding relationship (that is, a third corresponding relationship) between the error identifier and the error attribute from a configuration table (that is, a second configuration table) stored in the register.

Step 5503. Determine, based on the corresponding relationship (that is, the third corresponding relationship), the second error attribute corresponding to the second error identifier.

In this embodiment of the present disclosure, the third corresponding relationship may be determined by reading the information in the second configuration table. The second error attribute corresponding to the second error identifier may be determined efficiently and reliably based on the third corresponding relationship.

Figure 10:
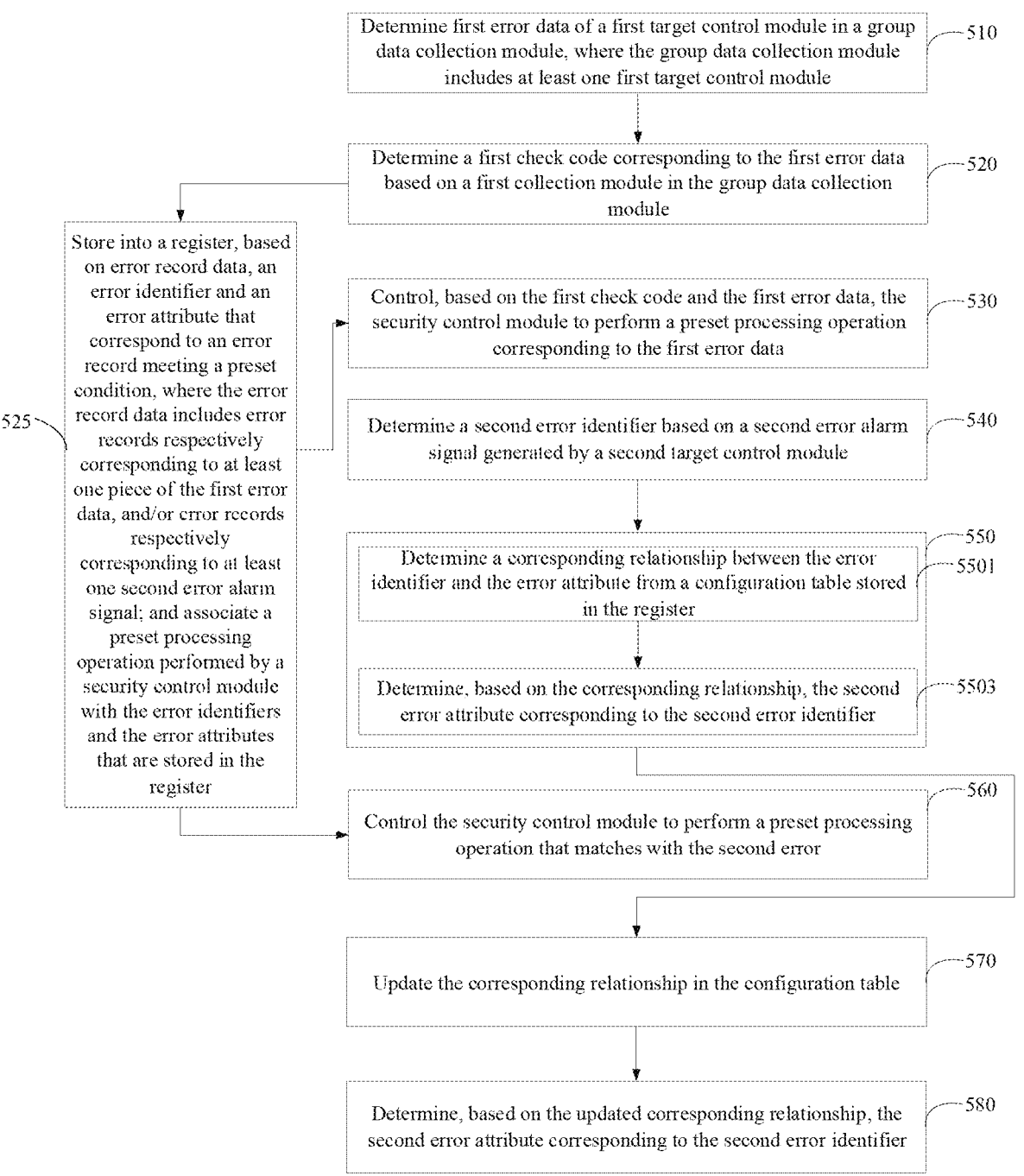
FIG. 10 is a schematic flowchart of a security control method for an integrated circuit according to a further exemplary embodiment of the present disclosure.

On the basis of the embodiment shown in FIG. 9, as shown in FIG. 10, the security control method for an integrated circuit includes the following steps.

Step 570. Update the corresponding relationship (that is, the third corresponding relationship) in the configuration table (that is, the second configuration table).

Step 580. Determine, based on the updated corresponding relationship (that is, the third corresponding relationship), the second error attribute corresponding to the second error identifier.

In this embodiment of the present disclosure, corresponding information in the third corresponding relationship may be modified in response to an information modification instruction sent by a user, so as to update the third corresponding relationship. In this way, when the second error attribute is determined in the following by using the updated third corresponding relationship, the determined second error attribute can better meet requirements of the user.

Figure 11:
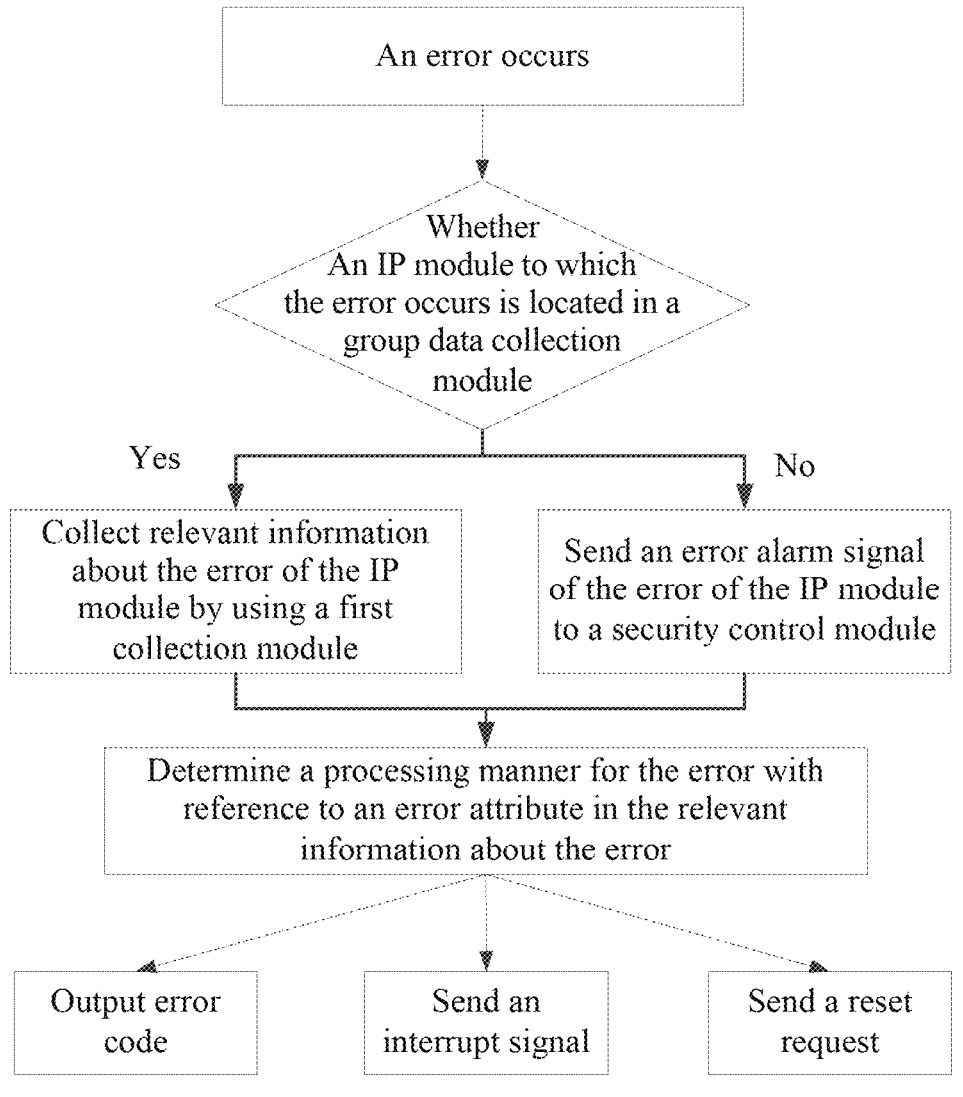
FIG. 11 is a schematic flowchart of a security control method for an integrated circuit according to a still further exemplary embodiment of the present disclosure.

In an optional example, as shown in FIG. 11, when an error occurs in a certain functional safety-related IP module in the integrated circuit, whether the IP module is located in the group data collection module may be determined.

If the IP module is located in the group data collection module, the first collection module may collect relevant information (which may include the first error data described above) about the error of the IP module, and send the collected relevant information to the security control module through a data bus.

If the IP module is not located in the group data collection module, an error alarm signal (equivalent to the second error alarm signal described above) of the error of the IP module may be directly sent to the security control module, so that the security control module determines the relevant information about the error.

For the error of the IP module, the security control module may determine a processing manner for the error with reference to an error attribute in the relevant information about the error. For example, the security control module notifies devices outside of a chip on which the integrated circuit is located through an operation of outputting an error code, or sends an interrupt signal to the central processing unit described above, or sends a reset request to the reset module described above.

Any security control method for an integrated circuit provided in the embodiments of the present disclosure may be implemented by any suitable device with a data processing capability, including but not limited to a terminal device and a server. Alternatively, any security control method for an integrated circuit provided in the embodiments of the present disclosure may be implemented by a processor. For example, the processor implements any security control method for an integrated circuit in the embodiments of the present disclosure by invoking corresponding instructions stored in a memory. Details are not described below again.

Exemplary Electronic Device

An electronic device according to an embodiment of the present disclosure is described below with reference to FIG. 12. The electronic device may be any one or two of a first device and a second device, or a stand-alone device separated from the first device and the second device. The stand-alone device may communicate with the first device and the second device, to receive an obtained input signal therefrom.

Figure 12:
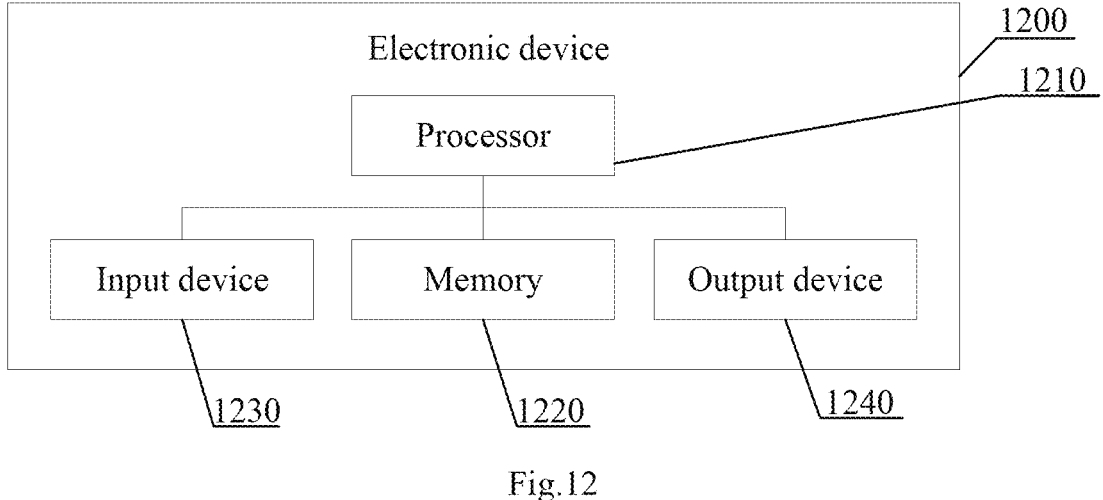
FIG. 12 is a diagram of a structure of an electronic device according to an exemplary embodiment of the present disclosure.

FIG. 12 shows a block diagram of an electronic device according to an embodiment of the present disclosure.

As shown in FIG. 12, an electronic device 1200 includes one or more processors 1210 and a memory 1220.

The processor 1210 may be a central processing unit (CPU) or another form of processing unit having a data processing capability and/or an instruction execution capability, and may control another component in the electronic device 1200 to perform a desired function.

The memory 1220 may include one or more computer program products. The computer program product may include various forms of computer readable storage media, such as a volatile memory and/or a non-volatile memory. The volatile memory may include, for example, a random access memory (RAM) and/or a cache. The nonvolatile memory may include, for example, a read-only memory (ROM), a hard disk, and a flash memory. One or more computer program instructions may be stored on the computer readable storage medium. The processor 1210 may execute the program instruction to implement the security control method for an integrated circuit according to various embodiments of the present disclosure that are described above and/or other desired functions. Various contents such as an input signal, a signal component, and a noise component may also be stored in the computer readable storage medium.

In an example, the electronic device 1200 may further include an input device 1230 and an output device 1240.

These components are connected to each other through a bus system and/or another form of connection mechanism (not shown).

For example, when the electronic device is the first device or the second device, the input device 1230 may be a microphone or a microphone array, which is configured to capture an input signal of a sound source. When the electronic device is a stand-alone device, the input device 1230 may be a communication network connector for receiving the collected input signal from the first device and the second device.

In addition, the input device 1230 may further include, for example, a keyboard and a mouse.

The output device 1240 may output various information to the outside, including determined distance information, direction information, and the like. The output device 1240 may include, for example, a display, a speaker, a printer, a communication network, and a remote output device connected by the communication network.

Certainly, for simplicity, FIG. 12 shows only some of components in the electronic device 1200 that are related to the present disclosure, and components such as a bus and an input/output interface are omitted. In addition, according to specific application situations, the electronic device 1200 may further include any other appropriate components.

Exemplary Computer Program Product and Computer Readable Storage Medium

In addition to the foregoing method and device, the embodiments of the present disclosure may also relate to a computer program product, which includes computer program instructions. When the computer program instructions are run by a processor, the processor is enabled to perform the steps, of the security control method for an integrated circuit according to the embodiments of the present disclosure, that are described in the "exemplary method" part of this specification.

The computer program product may be program codes, written with one or any combination of a plurality of programming languages, that are configured to perform the operations in the embodiments of the present disclosure. The programming languages include an object-oriented programming language such as Java or C++, and further include a conventional procedural programming language such as a "C" language or a similar programming language. The program codes may be entirely or partially executed on a user computing device, executed as an independent software package, partially executed on the user computing device and partially executed on a remote computing device, or entirely executed on the remote computing device or a server.

In addition, the embodiments of the present disclosure may further relate to a computer readable storage medium, which stores computer program instructions. When the computer program instructions are run by the processor, the processor is enabled to perform the steps, of the security control method for an integrated circuit according to the embodiments of the present disclosure, that are described in the "exemplary method" part of this specification.

The computer readable storage medium may be one readable medium or any combination of a plurality of readable media. The readable medium may be a readable signal medium or a readable storage medium. The readable storage medium may include, for example, but is not limited to an electricity, magnetism, light, electromagnetism, infrared ray, or semiconductor system, apparatus, or device, or any combination of the above. More specific examples (a non-exhaustive list) of the readable storage medium include:

an electrical connection with one or more conducting wires, a portable disk, a hard disk, a random access memory (RAM), a read-only memory (ROM), an erasable program-mable read-only memory (EPROM or a flash memory), an optical fiber, a portable compact disk read-only memory (CD-ROM), an optical storage device, a magnetic storage device, or any suitable combination of the above.

Basic principles of the present disclosure are described above in combination with specific embodiments. However, it should be pointed out that the advantages, superiorities, and effects mentioned in the present disclosure are merely examples but are not for limitation, and it cannot be con-sidered that these advantages, superiorities, and effects are necessary for each embodiment of the present disclosure. In addition, specific details described above are merely for examples and for ease of understanding, rather than limita-tions. The details described above do not limit that the present disclosure must be implemented by using the fore-going specific details.

The block diagrams of the equipment, the apparatus, the device, and the system involved in the present disclosure are merely exemplary examples and are not intended to require or imply that the equipment, the apparatus, the device, and the system must be connected, arranged, and configured in the manners shown in the block diagrams. It is recognized by a person skilled in the art that, the equipment, the apparatus, the device, and the system may be connected, arranged, and configured in an arbitrary manner.

It should be further pointed out that, various components or various steps in the apparatus, the device, and the method of the present disclosure may be disassembled and/or recom-bined. These disassembling and/or recombinations shall be regarded as equivalent solutions of the present disclosure.

What is claimed is:

1. A security control method for an integrated circuit, the integrated circuit comprising a group data collection module and a security control module, the group data collection module comprising a first collection module and multiple first target control modules electrically connected to the first collection module, the security control module being elec-trically connected to the first collection module by using a data bus, the method comprising:
   determining, by the first collection module, first error data of a first target control module in the group data collection module based on a first error alarm signal generated by the first target control module, wherein the first error data comprise a first error attribute and a first error identifier, and determining a first check code corresponding to the first error data by performing a preset check operation on the first error data; and
   performing, by the security control module based on the first check code and the first error data, a preset processing operation corresponding to the first error data;
   wherein the performing, by the security control module based on the first check code and the first error data, a preset processing operation corresponding to the first error data comprises:
   determining a second check code corresponding to the first error data by performing the preset check operation on the first error data;
   in response to that the second check code is the same as the first check code, determining the first error attribute based on the first error data; and
   performing a preset processing operation that matches with the first error attribute.

2. The method according to claim 1, wherein the deter-mining, by the first collection module, first error data of a first target control module in the group data collection module comprises:
   determining the first error identifier based on the first error alarm signal generated by the first target control mod-ule;
   determining the first error attribute corresponding to the first error identifier; and
   determining the first error data based on the first error identifier and the first error attribute.

3. The method according to claim 1, wherein the inte-grated circuit further comprises a second target control module electrically connected to the security control mod-ule, and the method further comprises:
   determining, by the security control module, a second error identifier based on a second error alarm signal generated by the second target control module; deter-mining a second error attribute corresponding to the second error identifier; and
   performing a preset processing operation that matches with the second error attribute.

4. The method according to claim 3, further comprising:
   storing into a register, based on error record data, an error identifier and an error attribute that correspond to an error record meeting a preset condition, wherein the error record data comprises error records respectively corresponding to at least one piece of the first error data, and/or error records respectively corresponding to at least one second error alarm signal; and the preset processing operation performed by the security control module is associated with the error identifiers and the error attributes that are stored in the register.

5. The method according to claim 4, wherein the perform-ing, by the security control module based on the first check code and the first error data, a preset processing operation corresponding to the first error data comprises:
   in response to the first error data corresponding to the error identifiers and the error attributes that are stored in the register, performing, based on the first check code and the first error data, the preset processing operation corresponding to the first error data; and
   wherein the performing a preset processing operation that matches with the second error attribute comprises:
   in response to the second error alarm signal corresponding to the error identifiers and the error attributes that are stored in the register, performing the preset processing operation that matches with the second error attribute.

6. The method according to claim 4, wherein the deter-mining a second error attribute corresponding to the second error identifier comprises:
   determining a corresponding relationship between the error identifier and the error attribute from a configu-ration table stored in the register; and
   determining, based on the corresponding relationship, the second error attribute corresponding to the second error identifier.

7. The method according to claim 6, further comprising:
   updating the corresponding relationship in the configura-tion table; and
   determining, based on the updated corresponding rela-tionship, the second error attribute corresponding to the second error identifier.

8. A security control apparatus for an integrated circuit, comprising a group data collection module and a security control module, wherein the group data collection module comprises a first collection module and multiple first target control modules electrically connected to the first collection module, and the security control module is electrically connected to the first collection module by using a data bus;

the first collection module is configured to determine first error data of a first target control module in the group data collection module based on a first error alarm signal generated by the first target control module, wherein the first error data comprise a first error attribute and a first error identifier, and determine a first check code corresponding to the first error data by performing a preset check operation on the first error data; and the security control module is configured to perform a preset processing operation corresponding to the first error data based on the first check code and the first error data;

wherein the performing, by the security control module based on the first check code and the first error data, a preset processing operation corresponding to the first error data comprises:

determining a second check code corresponding to the first error data by performing the preset check operation on the first error data;

in response to that the second check code is the same as the first check code, determining the first error attribute based on the first error data; and performing a preset processing operation that matches with the first error attribute.

9. The apparatus according to claim 8, further comprising a second target control module, wherein the security control module is electrically connected to the second target control module; and the security control module is configured to determine a second error identifier based on a second error alarm signal generated by the second target control module, determine a second error attribute corresponding to the second error identifier, and perform a preset processing operation that matches with the second error attribute.

10. The apparatus according to claim 9, wherein the security control module comprises a second collection module, a third collection module, a register, and a controller that is configured to perform the preset processing operation;

the second collection module is electrically connected to the first collection module by using the data bus, and is configured to receive the first error data and the first check code;

the third collection module is electrically connected to the second target control module, and is configured to receive the second error alarm signal;

the controller is electrically connected to the second collection module, the third collection module, and the register respectively through a first connection port, a second connection port, and a third connection port; and the controller is configured to store into the register, based on error record data, an error identifier and an error attribute that correspond to an error record meeting a preset condition, wherein the error record data comprises error records respectively corresponding to at least one piece of the first error data, and/or error records respectively corresponding to at least one second error alarm signal; and the preset processing operation performed by the controller is associated with the error identifiers and the error attributes that are stored in the register.

11. The apparatus according to claim 10, wherein the controller is configured to, in response to the first error data corresponding to the error identifiers and the error attributes that are stored in the register, perform the preset processing operation corresponding to the first error data based on the first check code and the first error data; and the controller is configured to, in response to the second error alarm signal corresponding to the error identifiers and the error attributes that are stored in the register, perform the preset processing operation that matches with the second error attribute.

12. The apparatus according to claim 10, further comprising a central processing unit, wherein the central processing unit is connected to the controller, and the preset processing operation comprises an operation of sending an interrupt signal to the central processing unit; and the central processing unit is configured to read, in response to the interrupt signal, the error identifiers and the error attributes that are stored in the register, and perform interrupt processing based on a reading result.

13. A non-transitory computer readable storage medium, wherein the storage medium stores a computer program, and the computer program is used for implementing a security control method for an integrated circuit, wherein the integrated circuit comprises a group data collection module and a security control module, the group data collection module comprises a first collection module and multiple first target control modules electrically connected to the first collection module, the security control module is electrically connected to the first collection module by using a data bus, and the method comprises:

determining, by the first collection module, first error data of a first target control module in the group data collection module based on a first error alarm signal generated by the first target control module, wherein the first error data comprise a first error attribute and a first error identifier, and determining a first check code corresponding to the first error data by performing a preset check operation on the first error data; and performing, by the security control module based on the first check code and the first error data, a preset processing operation corresponding to the first error data;

wherein the performing, by the security control module based on the first check code and the first error data, a preset processing operation corresponding to the first error data comprises:

determining a second check code corresponding to the first error data by performing the preset check operation on the first error data;

in response to that the second check code is the same as the first check code, determining the first error attribute based on the first error data; and performing a preset processing operation that matches with the first error attribute.

14. The non-transitory computer readable storage medium according to claim 13, wherein the determining, by the first collection module, first error data of a first target control module in the group data collection module comprises:

determining the first error identifier based on the first error alarm signal generated by the first target control module;

determining the first error attribute corresponding to the first error identifier; and determining the first error data based on the first error identifier and the first error attribute.

15. The non-transitory computer readable storage medium according to claim 13, wherein the integrated circuit further comprises a second target control module electrically connected to the security control module, and the method further comprises:

determining, by the security control module, a second error identifier based on a second error alarm signal generated by the second target control module;

determining a second error attribute corresponding to the second error identifier; and performing a preset processing operation that matches with the second error attribute.

16. The non-transitory computer readable storage medium according to claim 15, wherein the security control method further comprises:

storing into a register, based on error record data, an error identifier and an error attribute that correspond to an error record meeting a preset condition, wherein the error record data comprises error records respectively corresponding to at least one piece of the first error data, and/or error records respectively corresponding to at least one second error alarm signal; and the preset processing operation performed by the security control module is associated with the error identifiers and the error attributes that are stored in the register.

17. The non-transitory computer readable storage medium according to claim 16, wherein the performing, by the security control module based on the first check code and the first error data, a preset processing operation corresponding to the first error data comprises:

in response to the first error data corresponding to the error identifiers and the error attributes that are stored in the register, performing, based on the first check code and the first error data, the preset processing operation corresponding to the first error data; and wherein the performing a preset processing operation that matches with the second error attribute comprises:

in response to the second error alarm signal corresponding to the error identifiers and the error attributes that are stored in the register, performing the preset processing operation that matches with the second error attribute.

18. The non-transitory computer readable storage medium according to claim 16, wherein the determining a second error attribute corresponding to the second error identifier comprises:

determining a corresponding relationship between the error identifier and the error attribute from a configuration table stored in the register; and determining, based on the corresponding relationship, the second error attribute corresponding to the second error identifier.

* * * * *